United States Patent Office 2,874,786
Patented Feb. 24, 1959

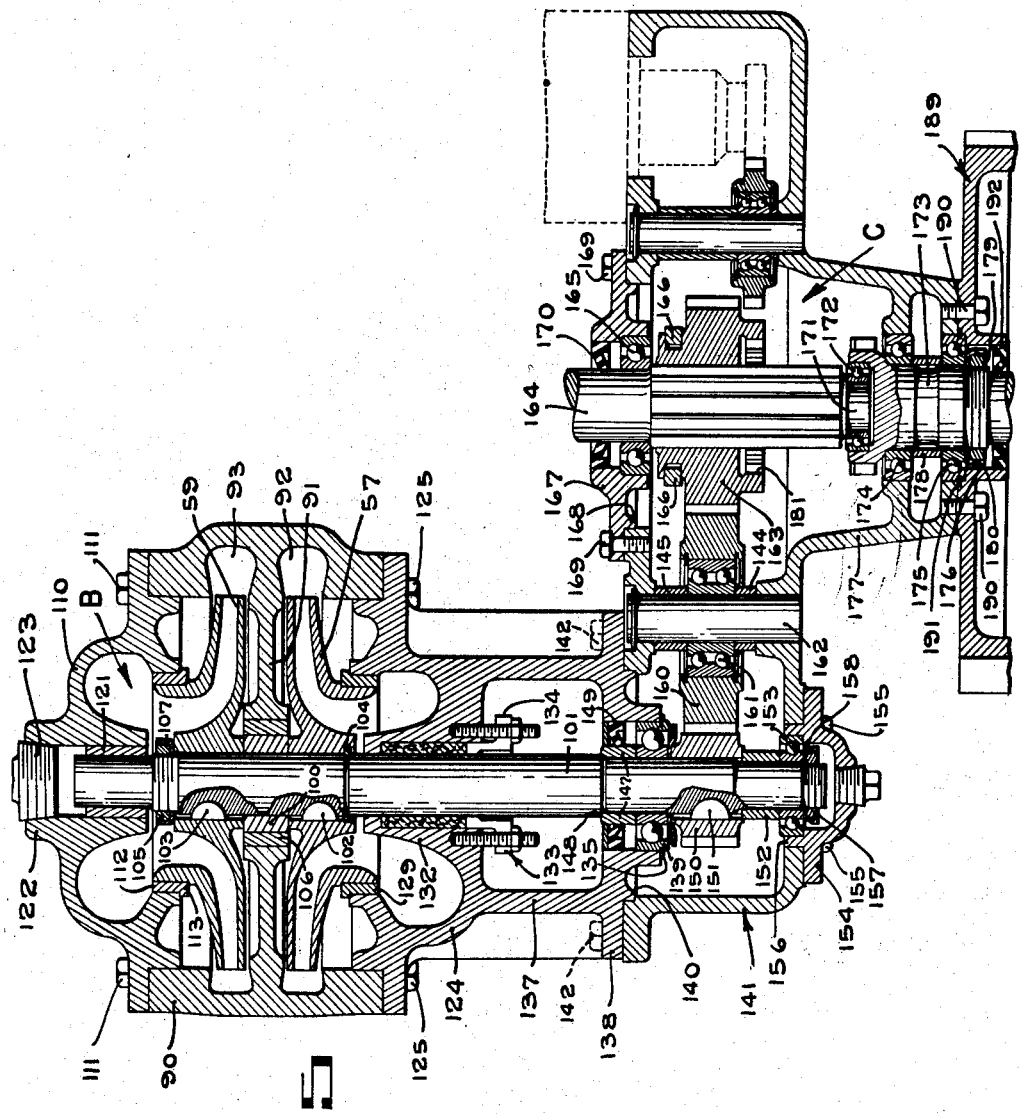

2,874,786

DRIVE AND BRAKE MECHANISM

William H. Cilker, Los Gatos, Calif., assignor to Food Machinery and Chemical Corporation, San Jose, Calif., a corporation of Delaware Original application March 12, 1951, Serial No. 215,060, now Patent No. 2,780,998, dated February 12, 1957. Divided and this application September 1, 1953, Serial No. 377,864

5 Claims. (Cl. 169—24)

The present invention relates to drive and brake mechanisms and more particularly to drive and brake mechanisms especially suitable for employment in and with fire engine pumps and vehicles.

This application is a division of my copending application, Ser. No. 215,060, filed March 12, 1951 for Fire Pump, now matured into Patent No. 2,780,998.

An object of my invention is to provide a novel and improved drive and brake mechanism for a fire engine pump and vehicle.

Another object is to incorporate vehicle parking brake mounting facilities as part of a pump combination.

Another object is to incorporate a vehicle parking brake as an element of a fire engine pump to thus facilitate installation of such pump upon an automotive vehicle and to also materially reduce costs and requirements of said vehicle parking brake.

Another object is to secure the optimum rigidity for the mounting of a vehicle parking brake by incorporating such brake as an element of a fire engine pump and rigidly mounting the latter upon a vehicle frame, so that braking stresses developed by said parking brake may be transmitted through the pump to the vehicle frame.

Another object is to incorporate a vehicle parking brake as an element of a fire engine pump, which parking brake and pump are designed as standard equipment and may be installed upon any well known make or type of fire truck to fit thereon without necessitating or requiring any alterations or modifications whatsoever.

Another object is to provide a compact and simplified parking brake for automotive fire fighting equipment.

These and other objects and advantages will become more apparent from the following description and accompanying drawings in which:

Fig. 1 is a perspective view looking from the rear of a pump and automotive vehicle chassis equipped with the drive and brake mechanism comprehended by the present invention, with portions of the vehicle chassis and drive and brake mechanism broken away and with other parts omitted for clarity of illustration.

Fig. 2, portions of the drive shafts being broken away.

Fig. 1.

Fig. 5 is an enlarged section taken along line 5—5 of Fig. 2, portions of drive shafts being broken away.

Figure 1:
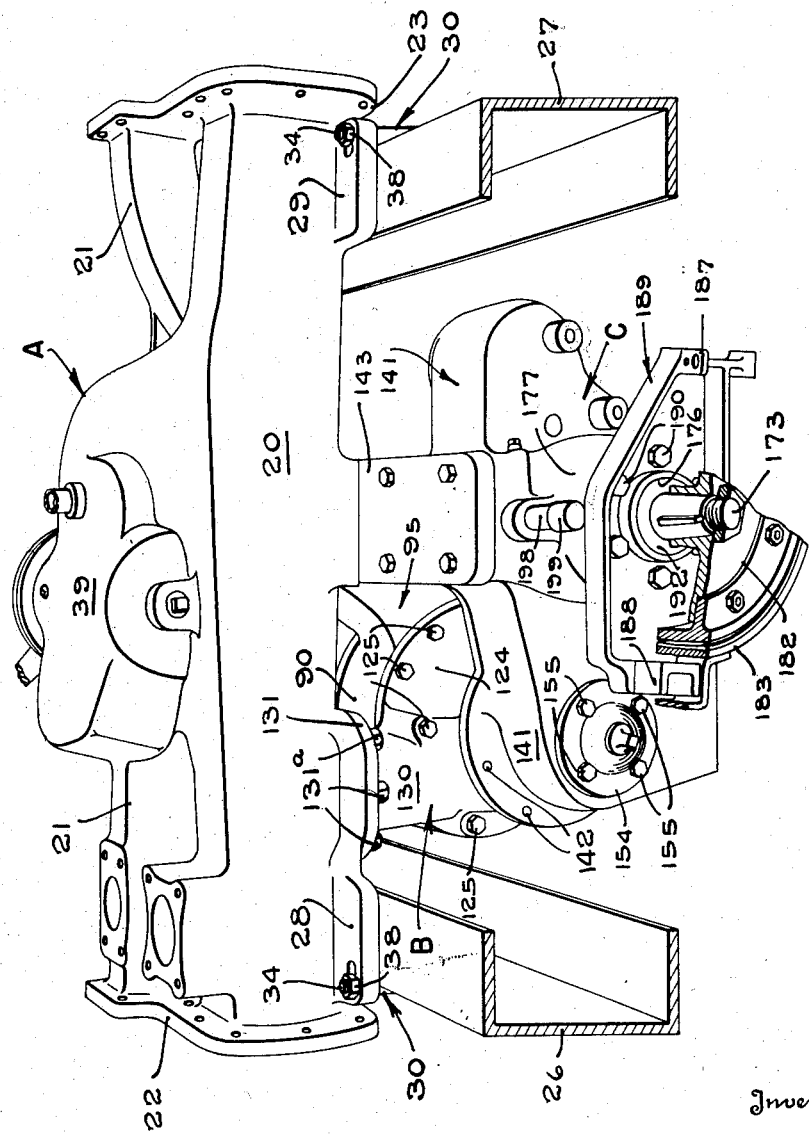

In the illustrated embodiment of the invention a valve-controlled manifold section A (Fig. 1 to 4) is adapted to be mounted transversely across the frame channels 26 and 27 of the chassis of an automotive vehicle, such as an ordinary automobile truck, to support the pump assembly thereon. An impeller section B is secured to the underside of the manifold A to be suspended therefrom, and a drive or gear housing C is secured to a side of the impeller section and also to the manifold A.

The mechanism of the gear housing section C is adapted to provide selective driving connection between the pump and a suitable prime mover, not shown, such as the engine of the motor vehicle upon which the pump is mounted.

For a readier understanding of the following description, it should be borne in mind, "forward" and "rearward" or words of similar import, as used herein, are intended to mean toward the front or rear of the automotive vehicle upon which the pump is mounted.

The manifold section A is made from a cored casting, having a relatively straight main inlet conduit 20 which extends the entire length of the manifold, and is open at both its ends. An open ended main discharge conduit 21, slightly smaller than the intake conduit 20, is formed to extend alongside the intake conduit the entire length of the manifold. The main conduits 20 and 21 are joined together at their ends by flanges 22 and 23.

Mounting pads 28 and 29 (Figs. 1, 2 and 3) are formed on the underside of the inlet manifold 20, near the ends thereof, and are adapted to rest on the chassis frame channel members 26 and 27, respectively, of the motor driven vehicle, not shown, on which the pump is mounted. The mounting pads 28 and 29 are secured to the chassis members 26 and 27 by anchor members 30 each of which has a plate-like lower portion 33 (Fig. 2) and a threaded, upwardly extending shank portion 34. The lower plate portions 33 of these anchor members are secured to the outer sides of the frame channels 26 and 27 by bolts 35, and the shank portions 34 are inserted through slotted openings provided therefor in the mounting pads 28 and 29. Nuts 38, screwed onto the threaded shank portions 34, are drawn down to secure the mounting pads firmly in position on the chassis channel frame members.

The impeller section B comprises a substantially cylindrical housing portion 90 having an annular central partition 91 cast integrally therewith. A pair of volutes 92 and 93 (Figs. 4 and 5) are formed interiorly of the cylindrical housing portion 90 on opposite sides of the central partition 91. The volute 92 receives liquid discharged by a first stage impeller wheel 57 and directs it upwardly through one passage 94 (Fig. 4) of a double passage conduit 95 cast integrally with the cylindrical housing portion 90, while the other volute 93 receives the liquid discharged by a second stage impeller wheel 59 and directs it upwardly into a second passage 97 (Fig. 4) of the double passage conduit 95.

The passage 94 in the double conduit 95 (Figs. 1, 2 and 5) communicates in any suitable manner at its upper end with the rear end portion of a valve housing 39 of the manifold A, to thereby establish communication with said rear end portion and the discharge side of the first stage impeller 57, while the upper end of the passage 97 is arranged to open directly into the main discharge conduit 21 of the manifold A. A flange 98 (Figs. 2 and 4), provided around the upper end of the double passage 95, is secured to the underside of the manifold A by cap screws 99.

A spacing sleeve 100 (Fig. 4) is mounted on an impeller shaft 101 to hold the oppositely facing impeller wheels 57 and 59 in proper axially spaced relation on the impeller shaft, the spacing sleeve being journalled in a bushing 106 mounted in the central opening of the annular partition 91. The impellers 57 and 59 are keyed (Fig. 5) to the impeller shaft 101 by Woodruff keys 102 and 103, respectively. The impeller wheels 57 and 59 and the spacer sleeve 100 are clamped between a snap ring 104 mounted in an annular groove in the impeller shaft 101 and a nut 105 screwed onto a threaded portion of the impeller shaft 101. The nut 105 is secured in adjusted position by a well known type of lock washer 107.

A second stage intake cap or suction housing 110 (Figs. 3, 4 and 5) is fitted onto the forward end of the cylindrical impeller housing portion 90 to enclose the intake side of the second stage impeller 59, and is secured thereon by cap screws 111.

A wear ring 112 (Figs. 4 and 5) having a radially extending flange 113 thereon is interposed between the intake cap 110 and the second stage impeller wheel 59. The wear ring is fitted into a circular opening in the intake cap 110 and the flange 113 is seated against the inner side of the intake cap around the opening in the intake cap properly to position the wear ring therein.

An upwardly extending second stage intake conduit 114 (Figs. 2 and 4) is cast integrally with the intake cap 110, its upper end having an attaching flange 115 formed integrally thereon and secured to the underside of the manifold A by cap screws 117. The second stage intake conduit 114 at its upper end is arranged to communicate in any appropriate manner with the forward end portion of the manifold valve housing 39.

A bearing bushing 121 (Figs. 4 and 5) is mounted in an axial opening in a boss 122 centrally of the intake cap 110, and the forward end of the impeller shaft 101 is journalled in the bushing 121. A taper-threaded plug 123 is screwed into a correspondingly threaded opening centrally of the boss 122 axially beyond the end of the impeller shaft to seal off the opening.

A first stage intake cap or suction housing 124 is mounted over the rear end of the cylindrical impeller housing portion 90 and is secured thereto by cap screws 125. The first stage intake cap 124 is provided with a wear ring 129 similar to the wear ring 112 for the second stage impeller wheel 59. An intake conduit 130 for the first stage impeller wheel 57 is formed integrally with the intake cap 124 and curves upwardly therefrom, its upper end being provided with an attaching flange 131 (Figs. 1, 2 and 4) which is secured, by cap screws 131a, to the underside of the manifold A to register with an opening 66 (Fig. 4) which opens directly into the main inlet conduit 20.

The impeller drive shaft 101 (Figs. 4 and 5) extends rearwardly from the impeller section B through an opening in a central boss 132 of the first stage intake cap 124, and is sealed thereto by a conventional stuffing box 133 having a split gland 134.

An arched gear housing connecting flange 137 (Figs. 3, 4 and 5) is cast integrally with the first stage intake cap 124 to overlie the rearwardly extending portion of the impeller shaft 101, and is provided with an upright mounting plate portion 138 on its rearward end. A ball bearing 139 (Fig. 5) is mounted in a flanged opening provided therefor in the upright plate portion 138 and is secured against axial displacement by a snap ring 135. The impeller shaft has journal support in this bearing 139. The plate portion 138 also has an annular centering flange 140 thereon concentric with the opening for the ball bearing 139, and this centering flange fits into an opening in the forward wall of a drive or gear housing 141 (Figs. 1 to 5). The gear housing is secured to the plate portion 138 by cap screws 142.

A strong gear housing support bracket 143 is secured (Figs. 1 to 4) to a pad provided therefor on top of the gear housing 141, the other end of the bracket being secured to the underside of the manifold A in any suitable manner, not shown. The strong support thus provided for the gear housing allows it to withstand the powerful torque stresses to which it is subjected by the operation of a parking brake mounted thereon in a manner to be described later herein.

Returning now to a further description of the rearward portion of the impeller shaft 101 (Fig. 5), a spacing collar 147 is mounted on a reduced portion of said impeller shaft between the inner race of the ball bearing 139 and a shoulder 148 formed by the reduction in diameter of the impeller shaft. A grease seal 149 is mounted in the bearing opening in the plate portion 138 forwardly of the ball bearing 139, and this seal has wiping, sealing engagement with the spacing collar 147. The spacing collar 147 is of slightly larger external diameter than the impeller shaft, and extends forwardly of the gear housing 141 beyond the grease seal 149, so that the collar 147 also acts as a slinger to cast outward by centrifugal force any water which might seep past the stuffing box 133 and creep rearwardly as a film along the impeller shaft 101.

A drive element comprising a spur gear 150 is keyed to the first reduced portion of the impeller shaft 101 by a Woodruff key 151, and a spacing sleeve 152 is mounted on a further reduced portion of the shaft 101 to separate the gear 150 axially from the inner race of a ball bearing 153. The outer race of the bearing 153 is inserted in a recess provided therefor in a cap 154, secured to the gear housing 141 by cap screws 155. A flange 156 on the cap 154 fits loosely into an opening in the gear case to permit the bearing 153 to be axially aligned with the bearing 139. A nut 157 screwed onto the threaded rear end of the impeller shaft 101 clamps the inner races of the bearings 139 and 153, the spur gear 150, the collar 147 and the sleeve 152 firmly together, at the same time forcing the spacing collar 147 tightly against the shaft shoulder 148. A lock washer 158 secures the nut 157 in adjusted position.

The spur gear 150 is of substantially smaller diameter than the opening in the gear housing 141 into which the centering flange 140 fits. In mounting the pump on an automotive vehicle care should be exercised to see that no portions of the pump assembly nor any of the necessary piping or wiring accessories are located immediately forwardly of the impeller section B. Therefore, upon release of the plate portion 138 from the gear housing 141, and release of the impeller section conduits 95, 114 and 130 from the underside of the manifold A, the entire impeller section B is free to be moved forwardly, withdrawing the rearward portion of the impeller shaft and the spur gear and bearings assembled thereon from the gear housing.

Preferably the cap 154 over the end of the impeller shaft 101 is removed before disassembling the impeller section B from the manifold and gear housing sections so as to entirely free the end of the impeller shaft from the gear housing. However, the fit between the outer race of the ball bearing 153 and the wall of the recess therefor in the cap 154 should be such as to permit relatively easy withdrawal of the bearing 153 from its seat, even if the cap 154 is left in place when removing the impeller section. A clearance of approximately one one-thousandth of an inch between the bearing 153 and the side wall of its recess in the cap has been found satisfactory.

An intermediate idler gear 160 is journalled on a double row ball bearing 161 mounted on a pin 162 secured in openings aligned lengthwise of the gear housing, and is positioned thereon by sleeves 144 and 145 so as to be in constant mesh with the spur gear 150 on the impeller shaft 101.

An internally splined gear 163 is slidably mounted on a correspondingly splined, power driven shaft 164 to have driven relation therewith. The sliding gear 163 is adapted to be moved axially to selected adjusted positions on the shaft 164 in a well known manner by a usual shifting fork 166, the two arms of which (Fig. 5) are adapted to ride in a groove in a hub portion of the sliding gear 163. The splined shaft 164 is journalled in a ball bearing 165 mounted in a flanged opening in a plate 167 having a centering flange 168 thereon which fits into an opening in the forward wall of the gear housing 141 and is secured in position thereon by cap screws 169. The splined shaft 164 extends forwardly and is connected to the usual transmission housing, not shown, of the automotive vehicle upon which the pump is mounted.

A grease seal 170 is mounted ahead of the ball bearing 165 to have wiping, sealing engagement with the shaft 164.

The rear end portion 171 of the splined shaft 164 (Fig. 5) is reduced in diameter and has the inner race of a ball bearing 172 fitted thereon. The outer race of the ball bearing 172 is fitted into an axial recess in the forward end of a short shaft 173 journalled in a pair of ball bearings 174 and 175. The outer races of the bearings 174 and 175 are mounted in annular seats provided therefor in the rearward end of a conical extension 177 of the gear housing 141. The inner races of the bearings 174 and 175 are retained in proper axially separated position on the short shaft 173 by a spacer 178 and are secured in position by a nut 179, screwed onto a threaded portion of the short shaft 173 and retained by a lock washer 180.

The sliding gear 163 has an internally toothed concentric ring portion 181 formed integrally on the rearward side thereof, the internal teeth of the portion 181 being adapted to receive the correspondingly externally toothed forward end of the short shaft 173 to provide direct driving connection between the splined shaft 164 and the short shaft 173. When not thus engaged, however, the splined, power driven shaft 164 is free to rotate on the ball bearings 165 and 172 relatively to the short shaft 173.

The short shaft 173 is adapted to be connected by a conventional type of universal joint, not shown, to a rearwardly extending conventional vehicle drive shaft, also not shown, to provide driving connection between the short shaft 173 and the rear wheels of the automotive vehicle upon which the pump is mounted. A conventional parking brake drum 182 (Fig. 1) is fitted and keyed to a tapered portion of the short shaft 173 which projects rearwardly beyond the gear housing 141, and a conventional parking brake band 183 is mounted on end abutments 187 and 188 of a brake band mounting bracket 189 (Figs. 1 to 5). The bracket 189 is secured by cap screws 190 onto the rear end of the tapered rearward extension 177 of the gear housing 141, and has a flanged central opening 176 (Figs. 1, 2 and 5) therein to permit the short shaft 173 to pass therethrough. A snap ring 191 inserted in a peripheral groove in the outer race of the ball bearing 175 is gripped between the brake band mounting bracket 189 and the tapered rearward extension 177 to secure the bearing against displacement. A grease seal 192 is mounted in the flanged opening 176 rearwardly of the nut 179 to have wiping, sealing engagement with the shaft 173.

The brake band 183 is adapted to be connected by usual cables and rods, not shown, to a conventional brake actuating lever, also not shown, so that the band 183 can be drawn into frictional engagement with the brake drum 182 to apply braking stresses to the short shaft 173, and thence to the drive wheels of the vehicle. The strong, rigid support for the gear housing section C provided by the bracket 143 which secures it to the manifold A, and the upright plate portion 138 and arched plate portion 137 which secures the gear housing to the impeller section B, assures ability to absorb the braking stresses imposed on the brake band mounting bracket 189, and to transmit these stresses to the vehicle frame members 26 and 27 upon which the manifold section A is mounted. Previously it has been necessary to device and build some sort of auxiliary support from the vehicle frame for mounting a parking brake on the drive shaft to the vehicle wheels, and such construction has added considerably to the cost of installing the pump in a vehicle, has required the use of a short drive shaft, and in many cases has required excessive maintenance.

The shifting fork 166 (Fig. 5) is mounted on a conventional sliding bar 194 (Fig. 4) which rides in the axially aligned bores of a pair of tubes 197 and 198 inserted in holes provided therefor in opposite walls of the gear housing 141. The guide tube 198 is capped at 199, and the other guide tube 197 has a usual packing nut 200 thereon to prevent the escape of grease from the gear housing along the sliding gear shift bar 194. The sliding bar 194 is connected by usual means, not shown, to a gear shift control lever, also not shown, mounted conveniently to an operator.

The incorporation, in the manner herein shown and described, of the novel and improved parking brake of the present invention as an element of a fire engine pump greatly facilitates installation of such type of pump in and upon an automotive vehicle and also materially reduces maintenance costs and requirements of said parking brake.

It should also be noted that the present parking brake is constructed as standard equipment for use with a fire pump and that no modification whatsoever of the brake mechanism is necessary or required to fit any particular type of fire truck. In consequence, whereof, the present parking brake and fire engine pump may be quickly installed upon the selected truck.

Furthermore, the present parking brake is more rigid than any of the various types of parking brakes heretofore in use, since the torque of the present brake is carried to the fire truck frame through the fire pump structure. To insure of optimum rigidity, the fire pump structure is designed and appropriately reinforced where deemed expedient to withstand the braking stresses imposed thereon.

Manifestly, therefore, utilization of the pump structure to transmit braking stresses to the fire truck frame, in the manner herein described, provides greater rigidity than was obtainable heretofore with former types of vehicle parking brakes, which in the main employed auxiliary cross frames as supports for transmitting torque to their respective vehicle frames.

While I have illustrated and described a preferred embodiment of the present invention, it will be understood, however, that various changes and modifications may be made in the details thereof without departing from the spirit and scope of the invention as set forth in the appended claims.

Having thus described the invention, what I claim as new and desire to protect by Letters Patent is as follows:

1. A drive and brake mechanism for a fire fighting vehicle, comprising a hollow, rigid manifold constructed and arranged to be mounted in fixed spanning relation between two spaced support members, a rigid bracket secured to said manifold and projecting outwardly therefrom, a drive housing secured to said bracket, a drive shaft journalled in said drive housing, a brake drum secured to said shaft adjacent said drive housing, and a braking element mounted on said drive housing adjacent said brake drum for movement into gripping engagement with said drum to prevent rotation of said shaft, said bracket being mounted on said manifold directly above said shaft and projecting in a direction generally parallel to said shaft whereby to effectively transmit to said manifold turning moments in either rotary direction caused by forces tending to rotate said shaft while said braking element is engaged with said brake drum.

2. A drive and brake mechanism for a fire fighting vehicle comprising two parallel longitudinally extending horizontal support members, a manifold extending transversely of and resting upon said support members and being directly connected at its ends to said support members, said manifold including elongated side, top, and bottom walls spaced apart and interconnected in hollow rectangular cross sectional arrangement to define a fluid passage therewithin, means establishing communication between the fluid source and the fluid passage of the manifold, a drive housing, a drive shaft rotatably mounted in said drive housing, drive means operably connected to said drive shaft, a rotary brake element mounted on said drive shaft to rotate therewith, a complemental brake element adjacent said rotary brake element, means mounting said complemental brake element on said drive housing whereby braking stresses are transmitted from said complemental brake element to the drive housing, and means securing said drive housing to said manifold whereby said braking stresses are transmitted to the support members through the manifold.

3. A drive and brake mechanism for a fire fighting vehicle, comprising two parallel longitudinally extending horizontal support members, a manifold extending transversely of and resting upon said support members and being directly connected at its ends to said support members, said manifold including elongated walls spaced apart and interconnected in hollow rectangular cross sectional arrangement to define a fluid passage therewithin, a drive housing, a drive shaft rotatably mounted in said drive housing, drive means operably connected to said drive shaft, a rotary brake element mounted on said drive shaft to rotate therewith, a complemental brake element adjacent said rotary brake element, means mounting said complemental brake element on said drive housing whereby braking stresses are transmitted from said complemental brake element to the drive housing, and means securing said drive housing to said manifold whereby said braking stresses are transmitted to the support members through the manifold.

4. A drive and brake mechanism for a fire fighting vehicle, comprising two parallel longitudinally extending horizontal vehicle frame members, a manifold extending transversely of said frame members, two pairs of mounting flanges located respectively adjacent the ends of said manifold, the flanges of each pair projecting horizontally outward from the bottom of said manifold and from opposite sides thereof, respectively, each of said pairs of mounting flanges resting upon one of said frame members to support said manifold, a connector member corresponding to each of said mounting flanges, each of said connector members having a first portion bolted to the corresponding mounting flange, and a second portion extending vertically downward from the first portion, bolt means passing horizontally through each said vertically downwardly extending portion and also through a portion of the respective frame member, rigid bracket means secured to said manifold intermediate said frame members, a drive housing secured to said bracket means, a drive shaft rotatably mounted in said drive housing, drive means operably connected to said drive shaft, a rotary brake element mounted on said drive shaft to rotate therewith, a complemental brake element adjacent said rotary brake element, and means mounting said complemental brake element on said drive housing whereby braking stresses are transmitted from said complemental brake element to said drive housing, and to said frame members through said manifold.

5. A drive and brake mechanism for a fire fighting vehicle, comprising two parallel longitudinally extending horizontal vehicle frame members, a manifold extending transversely of said frame members, horizontally extending mounting flange means secured to said manifold and corresponding to each of said frame members, each of said mounting flange means resting upon the corresponding frame member, connector means bolted to each of said mounting flange means, each of said connector means having a portion extending vertically downward from the corresponding mounting flange means, horizontally extending bolt means passing through each of said vertically downwardly extending portions and also through a portion of the respective frame member, a drive housing rigidly secured to said manifold, a rotatable drive shaft mounted in said drive housing, a rotary brake element for said drive shaft, and a complemental brake element mounted on said drive housing, whereby braking stresses are transmitted from said complemental brake element to said drive housing, and to said frame members through said manifold.

References Cited in the file of this patent
UNITED STATES PATENTS

| | | |
|---|---|---|
| 1,282,401 | Farmer | Oct. 22, 1918 |
| 1,584,252 | Sweet | May 11, 1926 |
| 2,112,651 | Fox | Mar. 29, 1938 |
| 2,207,575 | Boyles et al. | July 9, 1940 |
| 2,372,308 | Barton et al. | Mar. 27, 1945 |

UNITED STATES PATENT OFFICE
CERTIFICATE OF CORRECTION

Patent No. 2,874,786                                      February 24, 1959

William H. Cilker

It is hereby certified that error appears in the printed specification of the above numbered patent requiring correction and that the said Letters Patent should read as corrected below.

Figure 2:
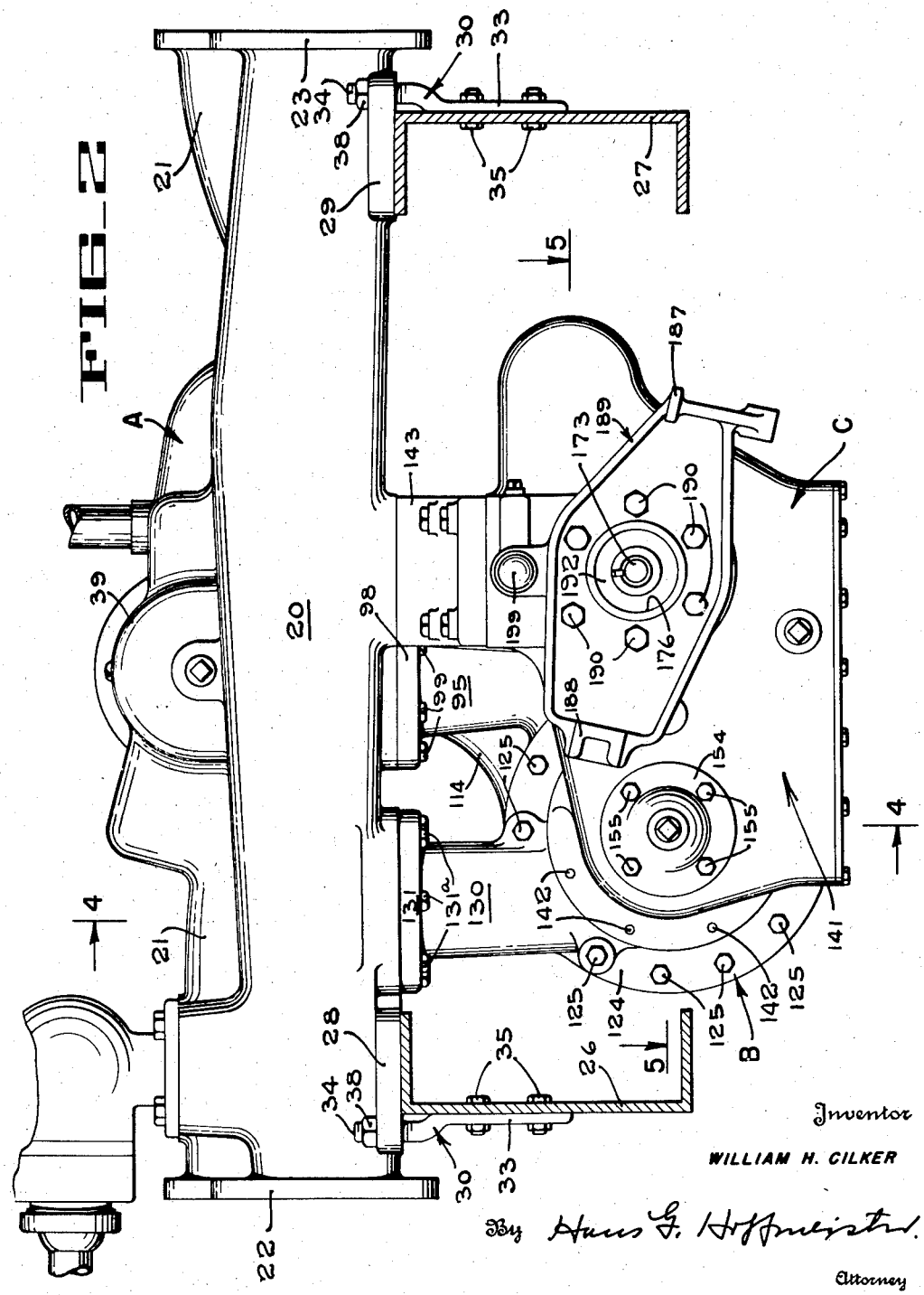
Figure 3:
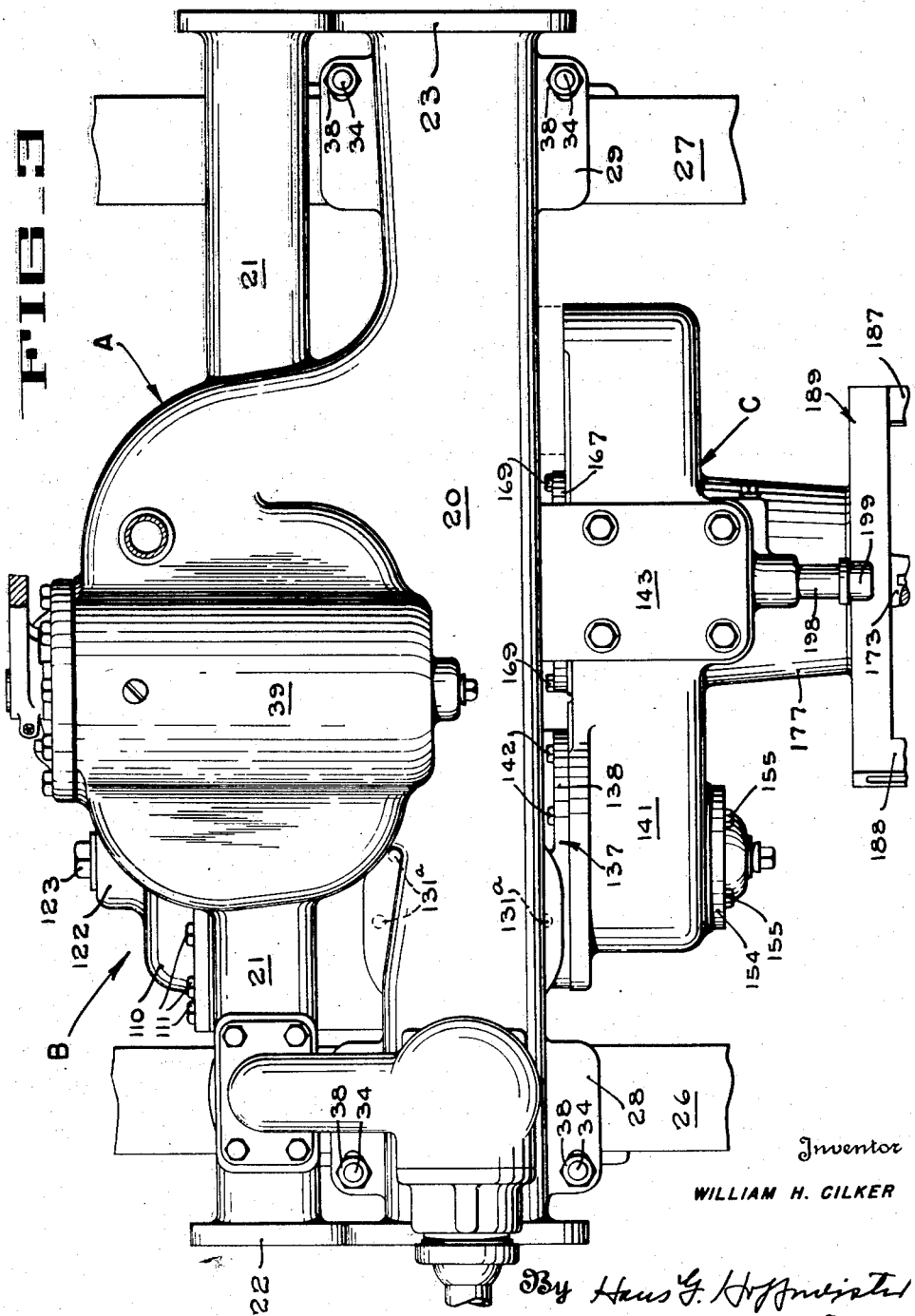
Fig. 3 is a plan view of the structure shown in Figs. 1 and 2.
Figure 4:
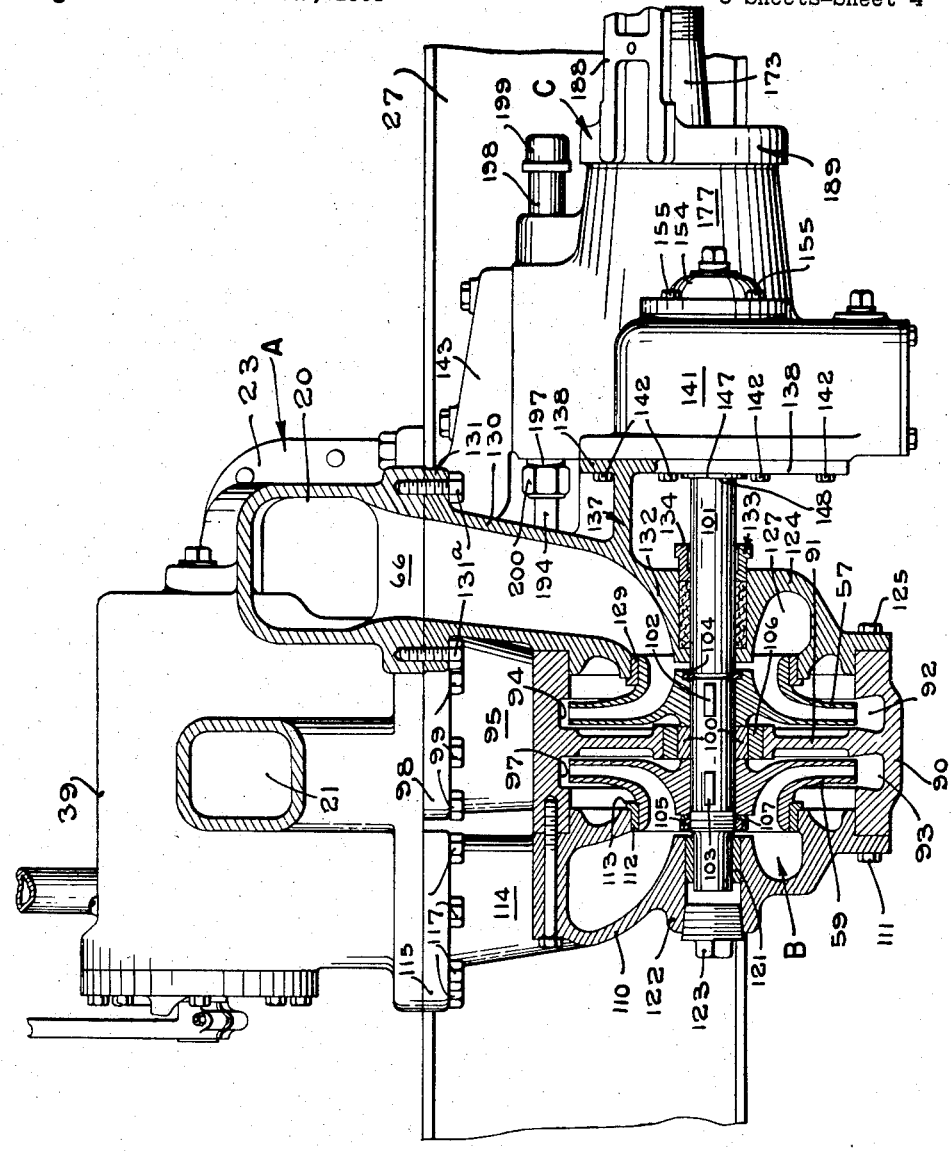
Fig. 4 is a vertical section taken along line 4—4 of Fig. 2.

Column 1, line 55, for "Fig. 2, portions of the drive shafts being broken away." read -- Fig. 2 is a rear elevation of the structure shown in Fig. 1. --; line 56, strike out "Fig. 1."; line 64, for "(Fig. 1 to 4)" read -- (Figs. 1 to 4) --.

Signed and sealed this 5th day of April 1960.

(SEAL)
Attest:

KARL H. AXLINE                                      ROBERT C. WATSON
Attesting Officer                                  Commissioner of Patents